United States Patent
Koski et al.

(10) Patent No.: US 9,548,660 B2
(45) Date of Patent: Jan. 17, 2017

(54) CIRCUIT AND METHOD TO COMPENSATE FOR EQUIVALENT SERIES INDUCTANCE (ESL) EFFECTS IN A BUCK REGULATOR

(71) Applicant: QUALCOMM Incorporated, San Diego, CA (US)

(72) Inventors: Marko Harry Koski, Chandler, AZ (US); Visu Vaithiyanathan Swaminathan, Chandler, AZ (US)

( * ) Notice: Subject to any disclaimer, the term of this patent is extended or adjusted under 35 U.S.C. 154(b) by 204 days.

(21) Appl. No.: 14/504,912

(22) Filed: Oct. 2, 2014

(65) Prior Publication Data

US 2015/0097537 A1 Apr. 9, 2015

Related U.S. Application Data

(60) Provisional application No. 61/888,338, filed on Oct. 8, 2013.

(51) Int. Cl.
*H02M 3/158* (2006.01)
*H02M 3/156* (2006.01)
*H02M 1/00* (2006.01)

(52) U.S. Cl.
CPC ........... *H02M 3/1588* (2013.01); *H02M 3/156* (2013.01); *H02M 2001/0025* (2013.01)

(58) Field of Classification Search
CPC H02M 2001/0025; H02M 1/14; H02M 1/143; H02M 1/44; H02M 3/156; H02M 3/1588; H02M 3/1563
See application file for complete search history.

(56) References Cited

U.S. PATENT DOCUMENTS

| 6,348,780 | B1 | 2/2002 | Grant |
| 7,388,357 | B2 | 6/2008 | Mitter et al. |
| 2006/0164055 | A1 | 7/2006 | Hata et al. |
| 2010/0027300 | A1 | 2/2010 | Fang |
| 2010/0301827 | A1* | 12/2010 | Chen ..................... H02M 3/156 323/299 |
| 2011/0260703 | A1* | 10/2011 | Laur ................... H02M 3/1563 323/271 |
| 2013/0002212 | A1* | 1/2013 | Fan ..................... H02M 3/1588 323/235 |
| 2013/0038308 | A1 | 2/2013 | Sumitomo |
| 2013/0093403 | A1 | 4/2013 | Jia et al. |
| 2013/0241516 | A1* | 9/2013 | Ueno ..................... G05F 1/618 323/285 |

FOREIGN PATENT DOCUMENTS

WO 2013032753 A2 3/2013

OTHER PUBLICATIONS

Meyer E.D., "New Technologies to Improve the Transient Response of Buck Converters," Queen's University, 2010, 283 pages.
International Search Report and Written Opinion—PCT/US2014/059573—ISA/EPO—Jan. 19, 2015.

* cited by examiner

*Primary Examiner* — Fred E Finch, III
(74) *Attorney, Agent, or Firm* — Haynes and Boone, LLP (57) ABSTRACT

A fast transient switching voltage regulator includes a reference signal generator to provide a reference in a feedback path to control switching. The reference signal generator is operative to incorporate a voltage offset into the reference signal timed with the control pulses used to control the switching. The voltage offset moves the reference signal out of the way of pulses introduced in the feedback path due to capacitance ESL in the output capacitor of the switching voltage regulator.

19 Claims, 8 Drawing Sheets

CIRCUIT AND METHOD TO COMPENSATE FOR EQUIVALENT SERIES INDUCTANCE (ESL) EFFECTS IN A BUCK REGULATOR

CROSS REFERENCE TO RELATED APPLICATION

Pursuant to 35 U.S.C. §119(e), this application is entitled to and claims the benefit of the filing date of U.S. Provisional App. No. 61/888,338 filed Oct. 8, 2013, the content of which is incorporated herein by reference in its entirety for all purposes.

BACKGROUND

Unless otherwise indicated, the foregoing is not admitted to be prior art to the claims recited herein and should not be construed as such.

Modern microprocessors and related digital electronics continue to require power supplies that are capable of supporting fast transient loading. Power supplies based on converters that operation in pulse width modulation (PWM) mode are a common design choice.

Fast transient buck regulators, for example, can be designed to respond to millivolts of change within nanoseconds. If the modulator component in a buck regulator is designed to respond quickly, the active modulating block (e.g., comparator, very fast error amplifier, etc.) can respond to disturbances resulting from the parasitic series inductance of the output capacitor, sometimes referred to as equivalent series inductance (ESL). Although a capacitor ESL exists in the output capacitor of any buck regulator design, lower frequency designs are generally not susceptible to this artifact of capacitor ESL. The effect becomes significant in buck regulators designed for high speed operation.

The disturbances arising from capacitor ESL manifest themselves as multiple pulses superimposed over a normal modulated switching waveform that drives the switching of the power transistors of the buck regulator. Resulting system level degradations include poor power efficiency due to increased switching losses, and poor noise performance.

Figure 6:
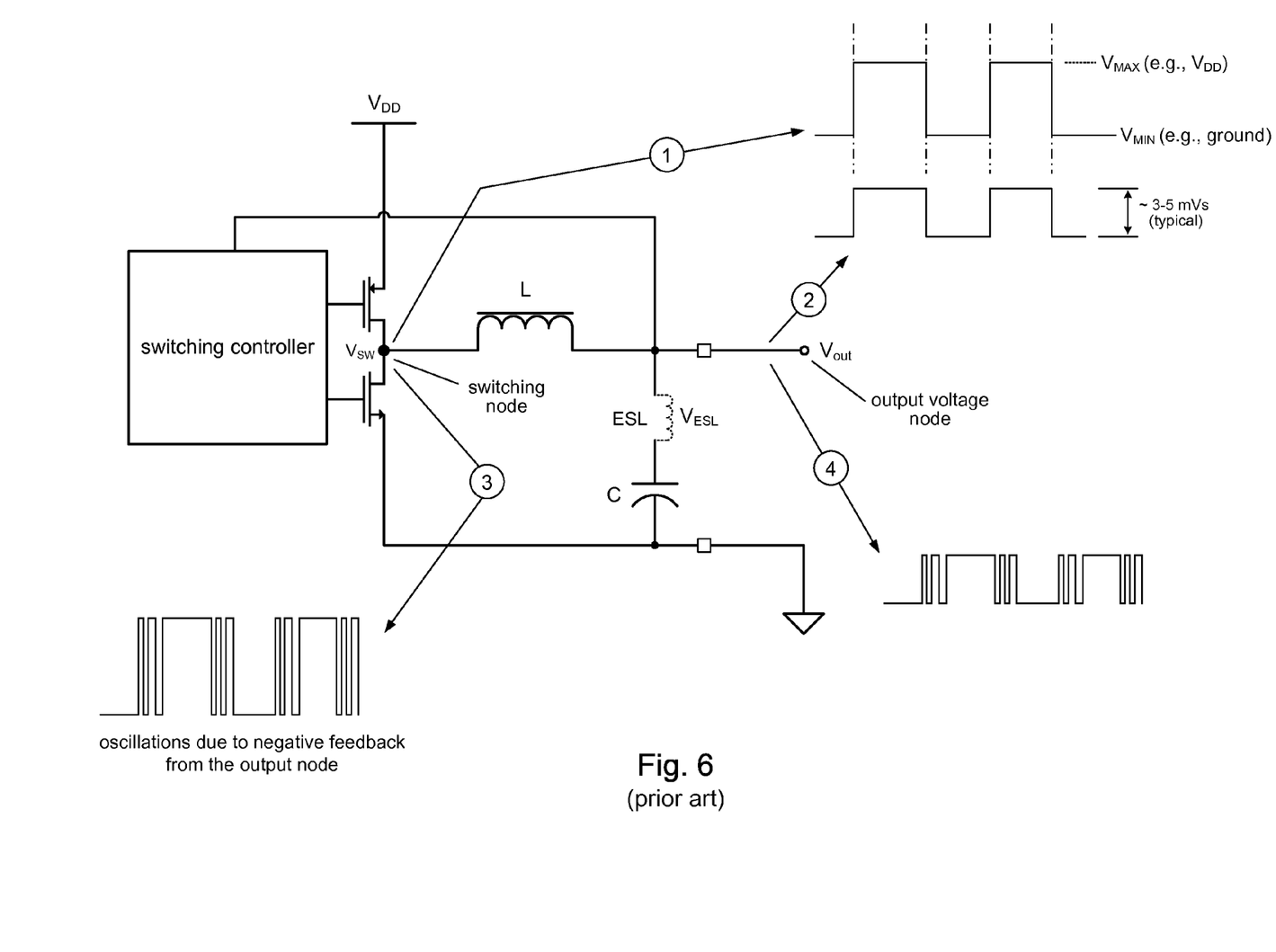
FIG. 6 illustrates the effect of capacitance ESL in the output capacitor of a switching voltage regulator.

Referring to FIG. 6, the output section of a buck converter is illustrated, showing the capacitor ESL. Capacitors are typically modeled with an equivalent series resistance (ESR) as well. For the purposes of this discussion, the ESR can be omitted to simplify the discussion without sacrificing technical accuracy. An inductor divider is formed between the primary buck inductor L and the capacitor ESL. Each time the switching node connecting the power transistors transitions between minimum and maximum voltage (e.g., ground potential and $V_{DD}$), the voltage swing $V_{SW}$ seen at the switching nodes (typically several volts) will be divided down by the ratio of the inductances of the primary inductor L and the capacitor ESL. Each transition (step) at the switching node creates a corresponding transition of several millivolts in magnitude at the output voltage node. The inductor current changes slope based on the law of $$v = L \times \frac{di}{dt}.$$

Since the capacitor ESL conducts the same AC current as the primary inductor L, $$\frac{di}{dt}$$

of the capacitor ESL is the same as the primary inductor. Accordingly, the magnitude of the ESL-generated transition at the output node can be represented by:

$$V_{ESL} = V_{SW} \times \frac{ESL}{L},$$

where ESL and L are respective inductance values of the capacitor ESL and the primary inductor.

The ESL transition at the output node, which feeds back as negative feedback into the switching controller, can cross over the reference signal that is used to generate the switching voltage. Waveforms 1 and 2 in FIG. 6 represent the waveforms of a slow response regulator, where the response time is greater than the ESL transitions.

By comparison, in a fast response regulator that is fast enough to respond to $V_{ESL}$, the ESL-generated negative feedback can result in oscillations in the switching voltage as the circuit tries to compensate for the transition. The oscillations continue until the reference signal level rises above the level of the ESL-generated artifact in the output node. This effect may be represented by waveforms 3 and 4 in FIG. 6.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
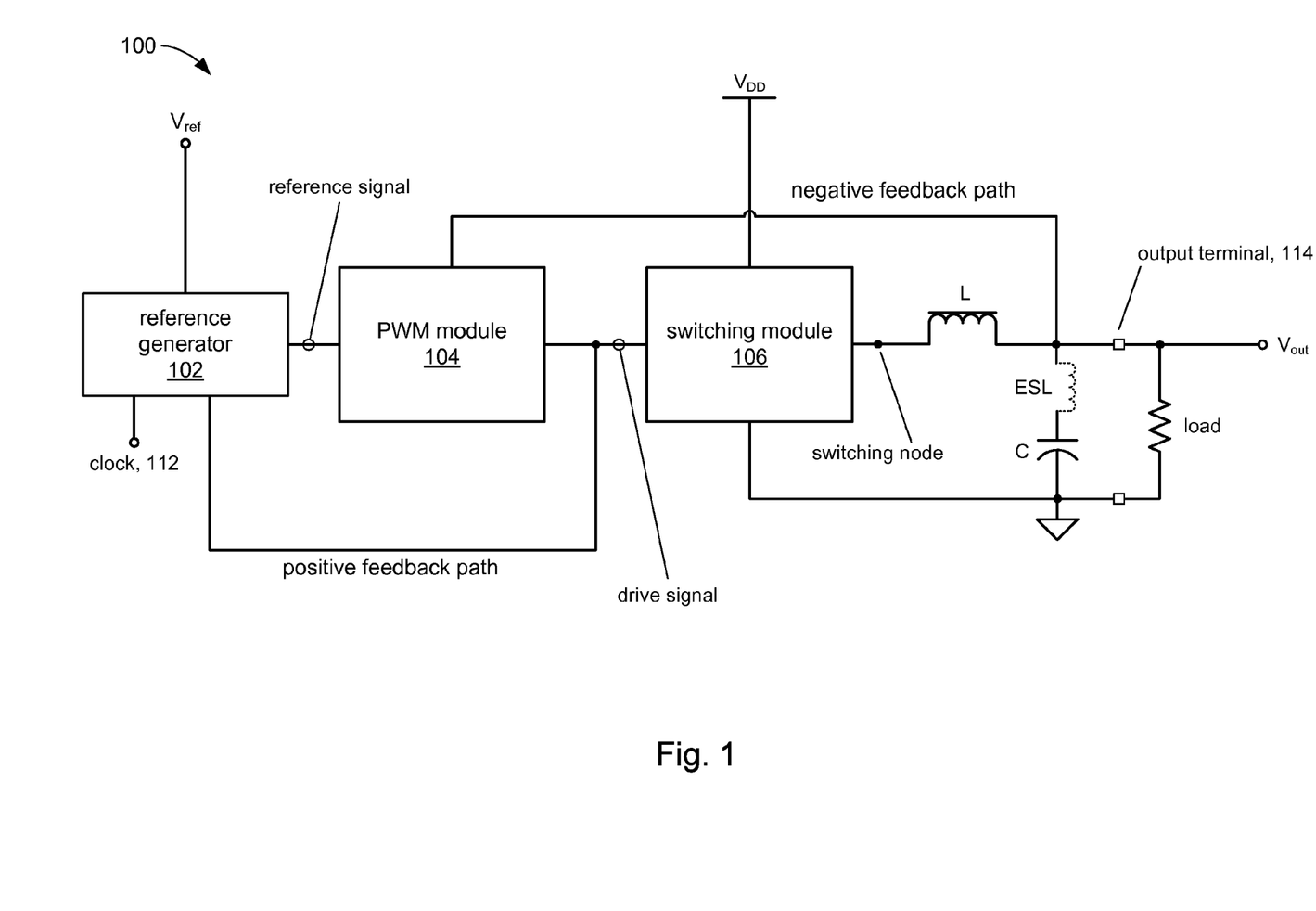
FIG. 1 shows a block level diagram of a circuit in accordance with the present disclosure.

FIG. 1 shows a block diagram for a voltage regulator circuit 100 in accordance with the present disclosure. The circuit 100 can regulate an input voltage (e.g., $V_{DD}$) to produce an output voltage $V_{out}$ at output terminal 114. In some embodiments, the circuit 100 may include a reference generator 102 operable to generate a reference signal. The reference generator 102 may include an input to receive a clock signal 112 and a reference voltage $V_{ref}$. The circuit 100 may further include a pulse width modulator (PWM) module 104 operable to generate a pulse waveform that can serve as a drive signal to drive a switching module 106. In some embodiments, the circuit 100 may further include a primary inductor L and output capacitor C.

The circuit 100 may include a negative feedback path from the output terminal 114 of the circuit 100 to the PWM module 104 to close the loop to regulate the voltage at the output terminal. In accordance with the present disclosure, the output of the PWM module 104 may be provided as positive feedback to the reference generator 102 to stabilize the output voltage $V_{out}$ against the effects of a capacitor ESL in the output capacitor C interacting with the primary inductor L. This aspect of the present disclosure will be discussed in more detail below.

Figure 2:
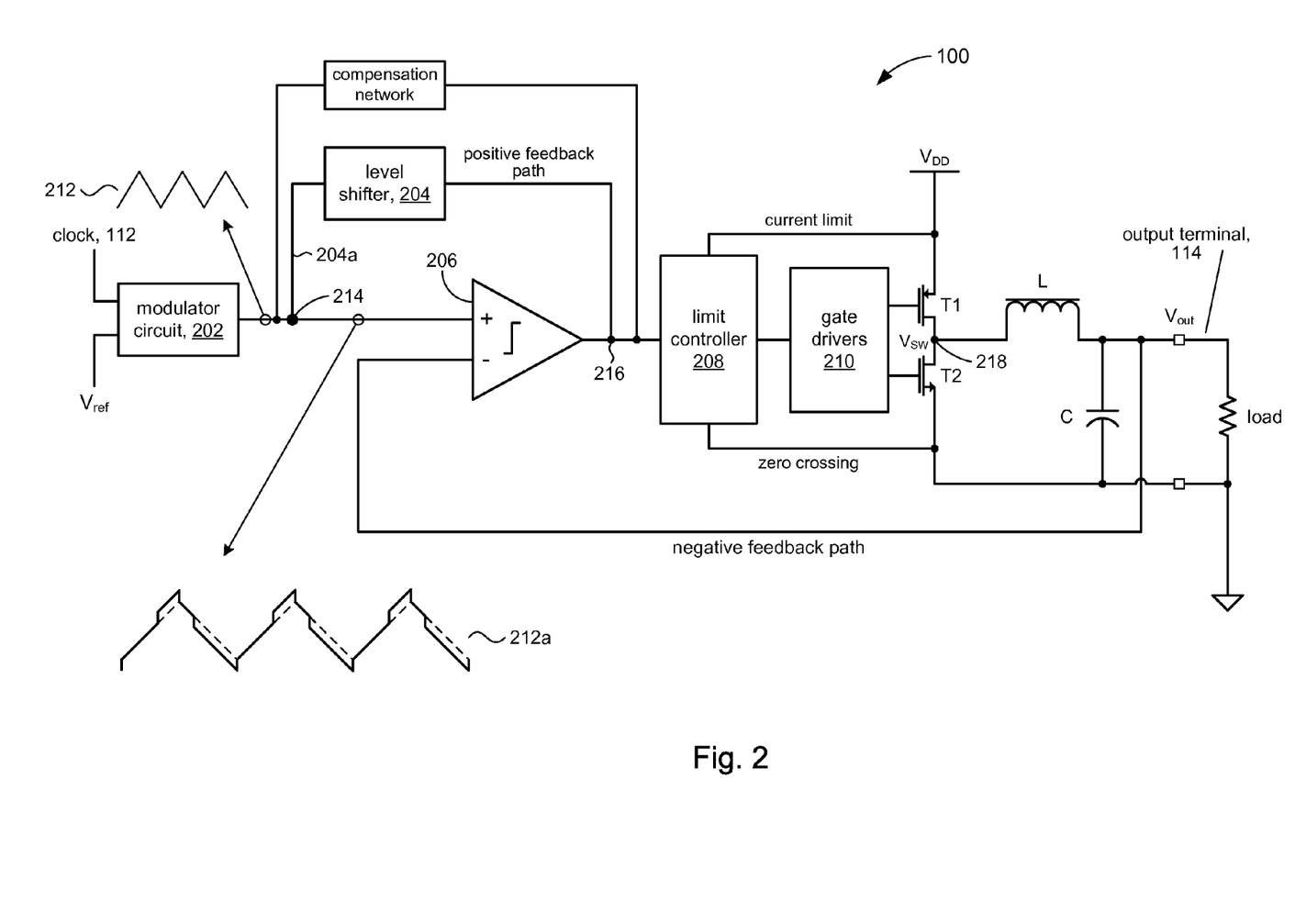
FIGS. 2 and 2A represent illustrative circuit embodiments in accordance with the present disclosure.

FIG. 2 shows details of circuit 100 in accordance with some embodiments of the present disclosure. The reference generator 102 may comprise a modulator circuit 202 having inputs to receive the clock signal 112 and reference voltage $V_{ref}$. In an embodiment, the modulator circuit 202 may generate a modulated signal 212 using the clock signal 112 and the reference voltage $V_{ref}$. For example, the modulator circuit 202 may include a triangle wave generator (not shown) that is driven by the clock signal 112 to produce a triangle wave. The reference voltage $V_{ref}$ can be modulated by the triangle wave to produce the modulated signal 212. In some embodiments, the modulator circuit 202 may use a sawtooth wave generator rather than a triangle wave generator. More generally, the modulator circuit 202 may use any suitable ramp-wave generator in place of the triangle wave generator.

The circuit 100 may include a level shifter 204 having an input connected to the output 216 of comparator 206. The output 204a of the level shifter 204 may be coupled to or otherwise combined with the output of the modulator circuit 202 at a node 214. In accordance with the present disclosure, the level shifter 204 may be operable to include or otherwise superimpose a voltage offset in the modulated signal 212, thereby generating a level-shifted modulated signal (reference signal) 212a. The reference signal 212a may then be coupled to the comparator 206.

In some embodiments, the PWM module 104 in FIG. 1 may comprise a comparator 206 shown in FIG. 2. The comparator 206 may comprise a non-inverting input and an inverting input. The reference signal 212a may be coupled to the non-inverting input of comparator 206. The output terminal may be connected to the inverting input of the comparator 206, thus providing a negative feedback directly from the output terminal 114. The output 216 of comparator 206 may output a pulse waveform (PWM signal) that can serve as a drive signal for driving switching transistors T1 and T2. In some embodiments, the T1 switching transistor may be a PMOS FET device and the T2 switching transistor may be an NMOS FET device.

In some embodiments, the switching module 106 in FIG. 1 may comprise a limit controller 208 and gate drivers module 210, as shown in FIG. 2. The comparator output 216 may connect to the limit controller 208. The limit controller 208 can operate as a state machine that detects current limit events or zero-crossing events. The limit controller 208 may pass the drive signal generated by the comparator 206 to gate drivers 210 if no current limit event or zero crossing event is detected. The limit controller 208 may clip the drive signal to modify the gate drive of the T1 switching transistor in the case of a current limit event. In the case of a zero-crossing event, the limit controller 208 may similarly modify the gate drive of the T2 switching transistor.

The gate drivers module 210 may comprise a high side driver circuit (not shown) to produce a signal to drive a control terminal (gate) of the T1 switching transistor, and a low side driver circuit (not shown) to produce a signal to drive a control terminal (gate) of the T2 switching transistor. The T1 and T2 switching transistors may be connected at a switching node 218. The switching node 218 may be connected to the output terminal 114 via the primary inductor L. It will be appreciated that the output capacitor C includes a capacitance ESL as explained above.

Figure 2A:
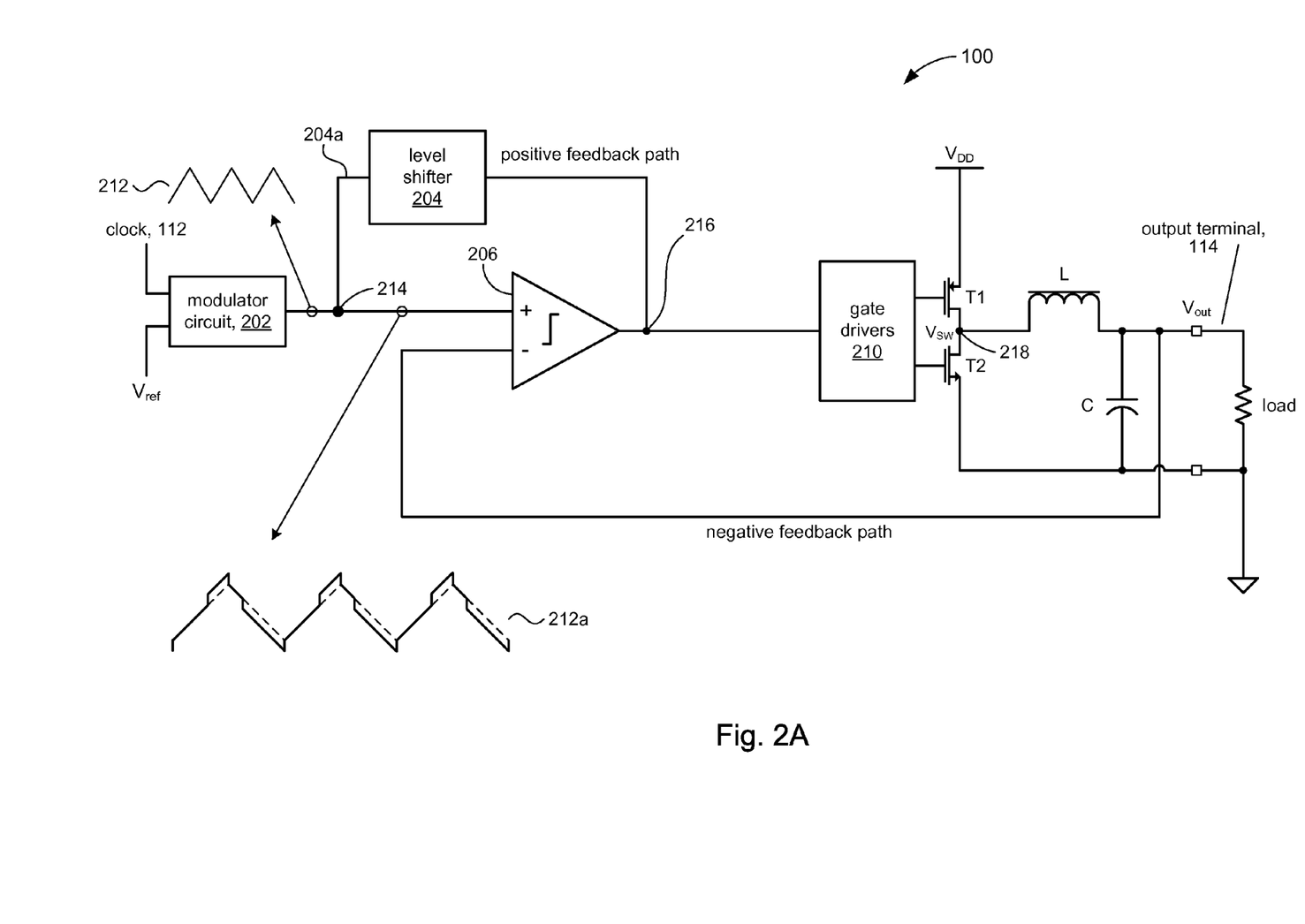

In some embodiments, see for example FIG. 2A, the limit controller 208 may be omitted from circuit 100. In such embodiments, the pulse waveform produced by comparator 206 may connect to the gate drivers 210 to drive the switching transistors T1 and T2. The compensation network shown in FIG. 2 is omitted in FIG. 2A to avoid clutter, but is understood to be provided in the negative feedback path such as illustrated in FIG. 2, for example.

Figure 3:
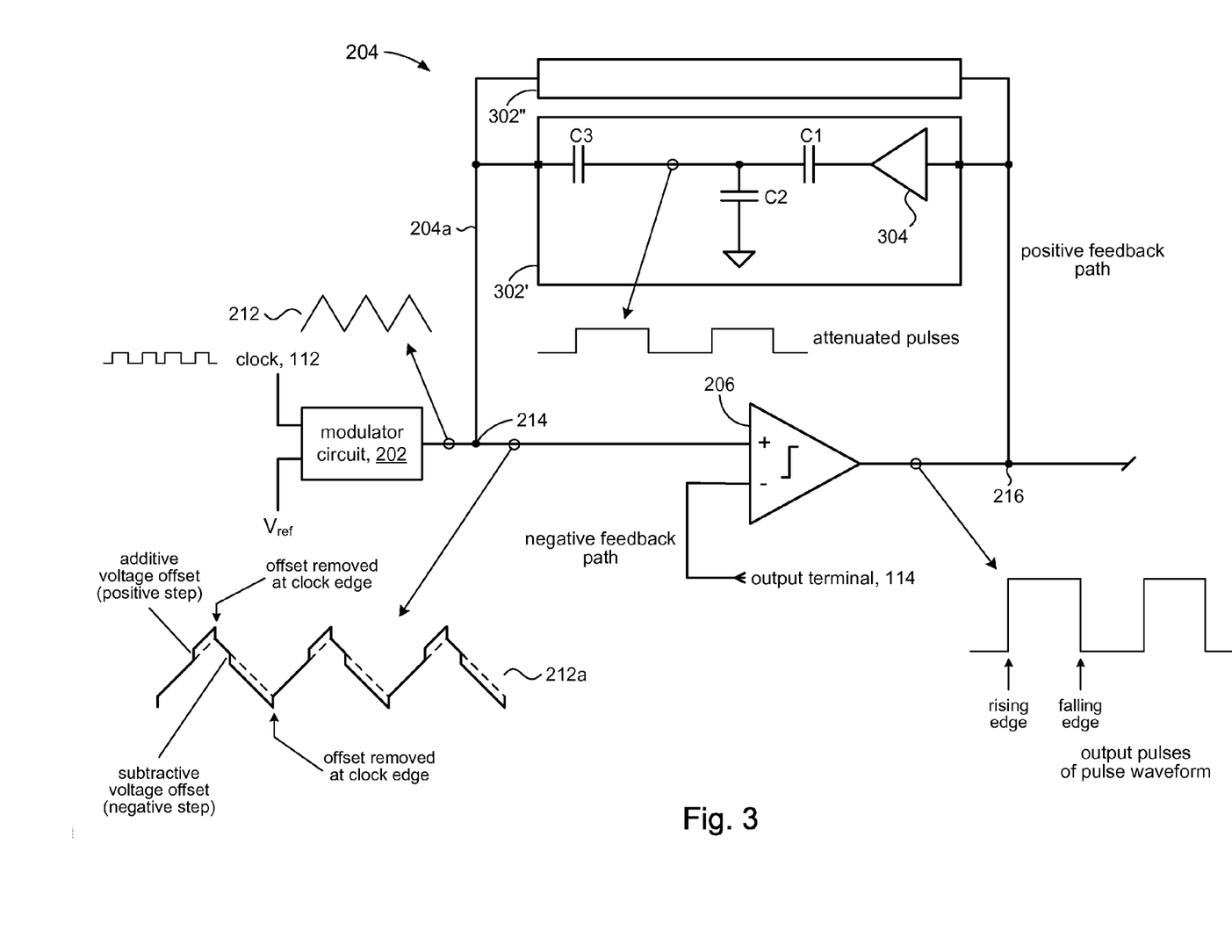
FIGS. 3 and 3A represent illustrative embodiments of a level shifter in accordance with the present disclosure.

FIG. 3 shows a level shifter 204 in accordance with the present disclosure. The compensation network (shown in FIG. 2) is omitted in FIG. 3 to avoid clutter, but is understood to be provided in the negative feedback path such as illustrated in FIG. 2, for example.

In some embodiments, the level shifter 204 may comprise two shifting circuits 302', 302". Shifting circuit 302', for example, may comprise a digital buffer 304 having an input connected to the output 216 of comparator 206. The output of digital buffer 304 may be connected to a capacitor divider network comprising capacitors C1 and C2. The shifting circuit 302' may include a coupling capacitor C3 to AC-couple the output 204a of the shifting circuit to the output of modulator circuit 202 at node 214. Shifting circuit 302" may be similarly constructed and use different values for capacitors C1-C3. The level shifters 302', 302" allow for the additive and subtractive offsets shown in the waveform.

In operation, the output pulses of the pulse waveform produced at the output 216 of comparator 206 are coupled into the digital buffer 304. The digital buffer 304 serves largely to electrically isolate the shifting circuit 302' from the comparator 206. In some embodiments, the digital buffer 304 may provide some attenuation of the amplitude of the output pulses. The capacitor divider network C1/C2 further attenuates the output pulse amplitudes. The attenuated pulses can then be coupled to the output of modulator circuit 202 via the AC coupling capacitor C3 at node 214. The shifting circuit 302" operates in much the same way.

The shifting circuits 302', 302" can introduce positive and negative voltage offsets into the modulated signal 212, and thus creates the level-shifted reference signal 212a that is coupled into the comparator 206. In some embodiments, the voltage offset is additive on the rising edges of the attenuated pulses and subtractive on the falling edges of the attenuated pulses, as illustrated in FIG. 3.

The attenuated pulses may be viewed as a series of step functions. A rising edge of the attenuated pulse may be viewed as a positive-going step function that is coupled to the modulated signal 212 to introduce a positive step into the modulated signal to create reference signal 212a. Similarly, a falling edge of the attenuated pulse may be viewed as a negative-going step function that is coupled to the modulated signal 212 to introduce a negative step into the modulated signal. In some embodiments, the positive step and negative step may be obtained from the clock 112 that is used to generate the triangle waveform. Accordingly, the additive offset and subtractive offset may be removed (zeroed out) at the edges of clock 112.

In accordance with the present disclosure, the voltage offset introduced into modulated signal 212 to produce the level-shifted signal 212a can be synchronized with the rising and falling edges of the output pulses of the pulse waveform at output 216 of the comparator 206. In some embodiments, FIG. 3 for example, the voltage offset may be synchronized to the output pulses by virtue of the level shifter 204 using the output 216 of comparator 206. In other embodiments, not shown, the voltage offsets introduced into modulated signal 212 may be synchronized with the output of comparator 206 indirectly using timing signals other than the output pulses of the comparator.

Figure 3A:
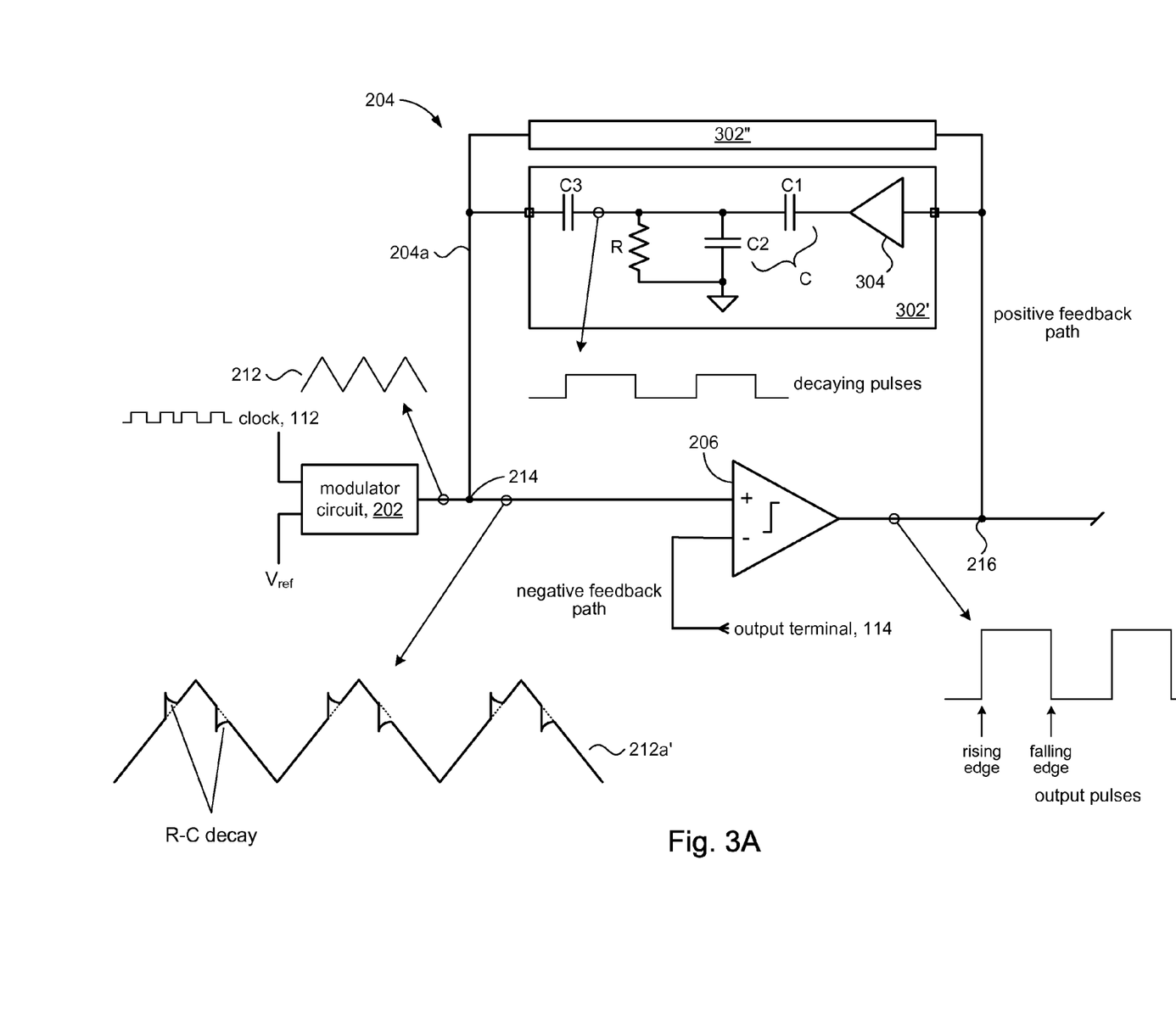

FIG. 3A illustrates another embodiment of the level shifter 204 in accordance with the present disclosure. The compensation network shown in FIG. 2 is omitted in FIG. 3A to avoid clutter, but is understood to be provided in the negative feedback path such as illustrated in FIG. 2, for example.

In the embodiment shown in FIG. 3A, each of the shifting circuits 302', 302" further includes a resistor R connected to the capacitor divider network C1/C2 The resistor R introduces an R-C decay to the step function. The R-C decay characteristic may be incorporated (e.g., AC-coupled) into the modulated signal 212 to produce the reference signal 212a'. In this embodiment, the edges of clock 112 are not needed to remove the offset because the offset will decay by operation of the R-C network.

In the embodiments shown in FIGS. 3 and 3A, the node 214 represents an electrical connection of the output of the level shifter 204 to the output of the modulator circuit 202 in order to AC-couple the voltage offset produced by the level shifter into the output of the modulator circuit. In other embodiments, the voltage offset may be combined with the output of the modulator circuit 202 using suitable circuitry such as a summing circuit or the like (not shown).

Figure 3B:
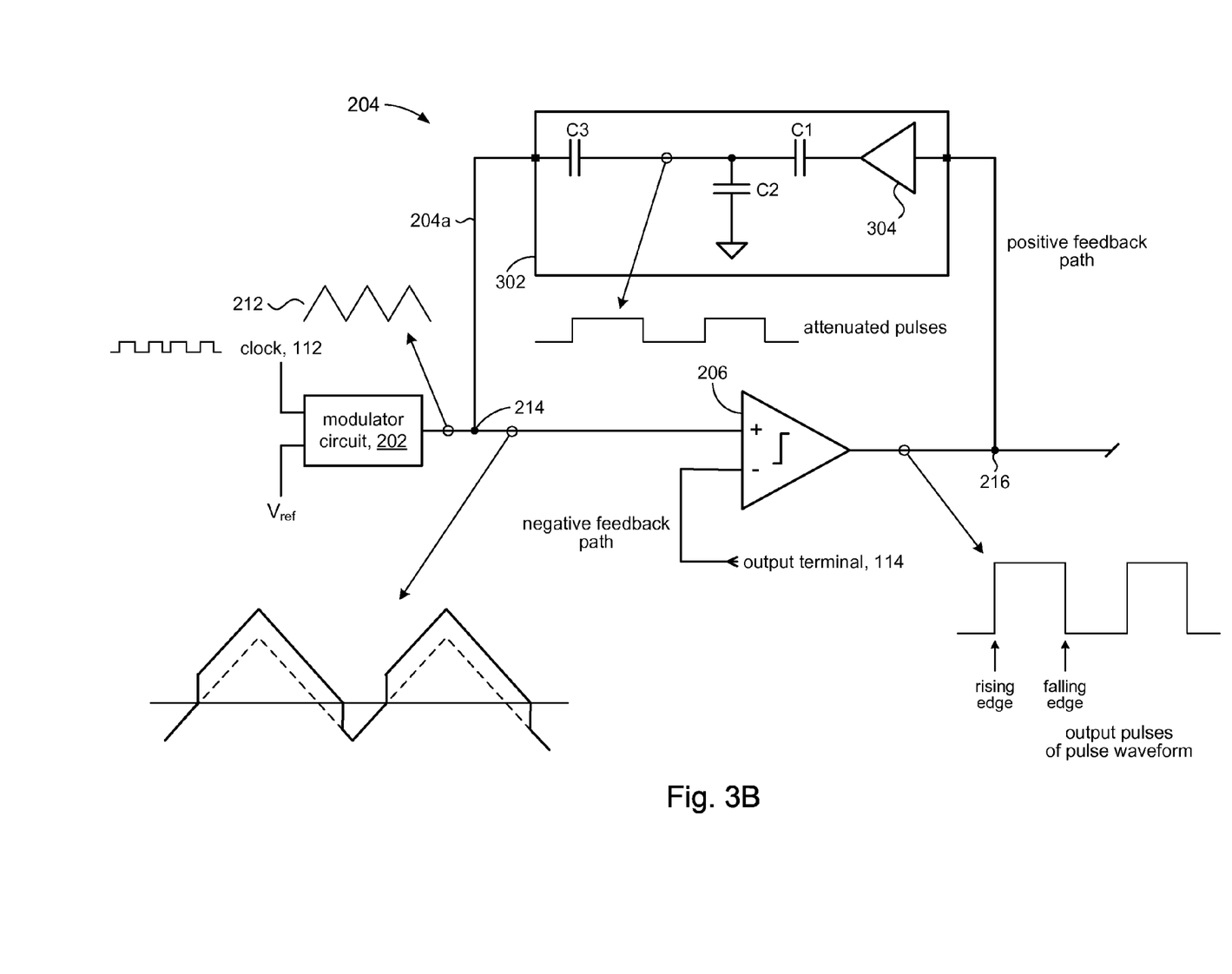
FIG. 3B illustrates an example of a level shifter having a single shifting circuit.

FIG. 3B illustrates an example of a level shifter 204 having a single shifting circuit 302. In this embodiment, clock pulses from the clock 112 are not required to reset the offset; there are only two states: positive offset and zero offset. By comparison, the embodiments shown in FIGS. 3 and 3A have three offset states: positive, negative, and zero.

Figure 4A:
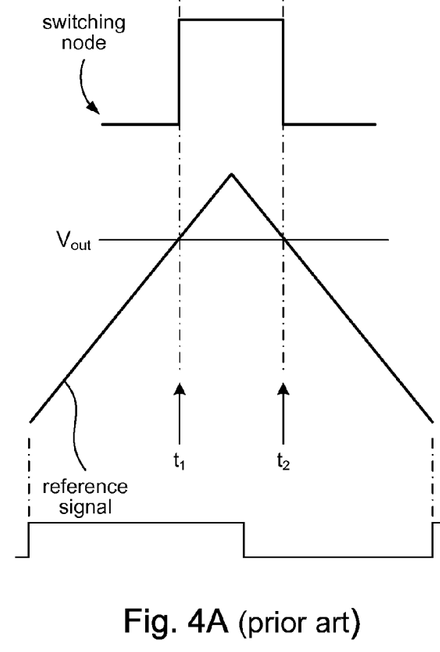
FIGS. 4A and 4B illustrate the effect of capacitance ESL in the output capacitor of a switching voltage regulator.
Figure 4B:
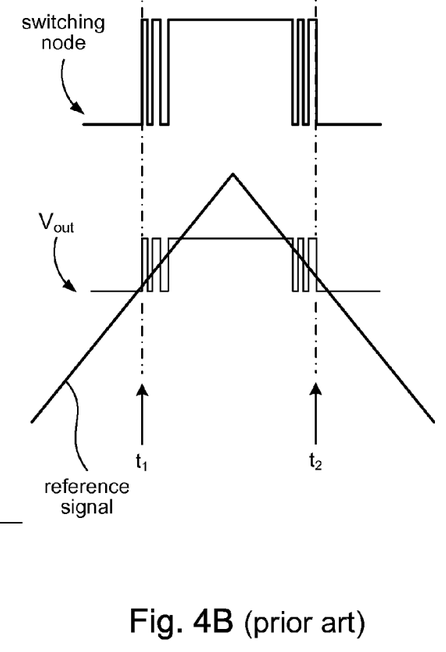

FIGS. 4A and 4B further illustrate the nature of the problem that capacitance ESL in the output capacitor of a fast transient buck converter can create, initially discussed above in connection with FIG. 6. FIG. 4A represents the response for an ideal output capacitor that has no ESL component. The bottom waveform in FIG. 4A represents the reference signal being compared with the output voltage $V_{out}$; e.g., using a comparator. In some implementations, $V_{out}$ may go through a gain block so that the comparison may be made with a larger amp than otherwise. The gain block may be an amplifier of any known type. For example, the gain block may be in the form of an error amplifier by subtracting out the reference.

When the level of the reference signal crosses the level of $V_{out}$ (e.g., at time $t_1$), the comparator triggers. The comparator trigger causes the level at the switching node to transition (represented by the top waveform in FIG. 4A). In the case of an ideal capacitor with no ESL, there is no voltage divider action with the primary inductor to create a pulse that is superimposed on the output voltage $V_{out}$ that would create oscillations in the switching node.

Likewise, at time $t_2$, when $V_{out}$ and the reference signal cross on the down slope of the reference signal, the comparator triggers and causes the switching node to transition. Again, since there is no ESL, there is no voltage divider action to create a pulse that is superimposed on the output voltage, and again no oscillations are set up in the switching node.

FIG. 4B represents the response for an output capacitor that has an ESL component. As in FIG. 4A, when the level of $V_{out}$ and the level of the reference signal cross (e.g., at time $t_1$), the comparator triggers and the switching node transitions. In this situation, the primary inductor and capacitance ESL form a voltage divider. The voltage divider creates a small step that is fed back to the comparator, and as explained in connection with FIG. 6, oscillations in the switching node arise as the feedback loop tries to compensate for the step. The oscillations appear at $V_{out}$. The oscillations continue until the reference signal rises above the level of the pulses in $V_{out}$, thus terminating the oscillations. The oscillations recur at time $t_2$ when the output voltage and the reference signal cross on the down slope and the switching node transitions, creating a small step in the output voltage that the feedback loop tries to compensate for.

Figure 5:
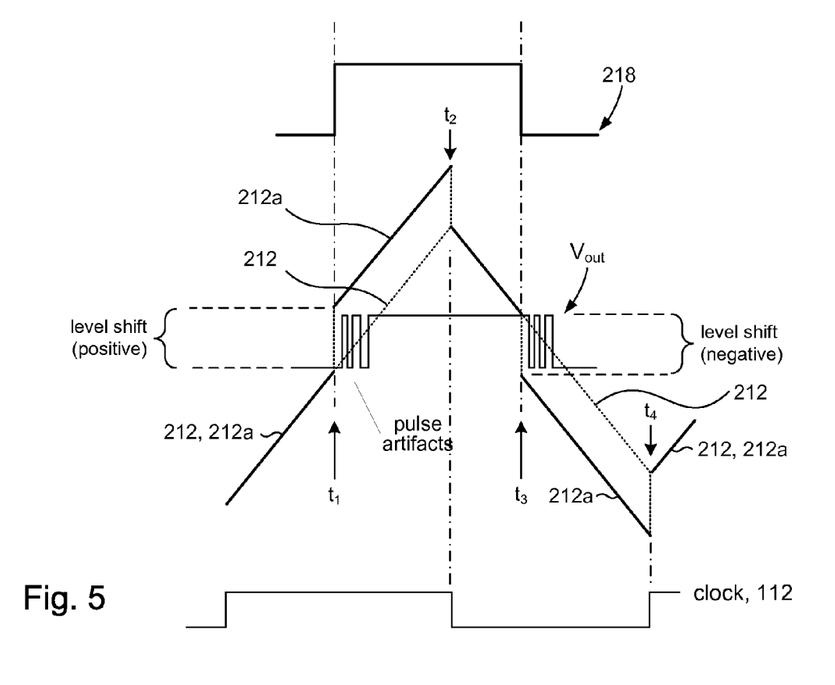
FIG. 5 illustrates operation of the circuit embodiments shown in FIGS. 2 and 2A.

FIG. 5 illustrates operation of the circuit 100 shown in FIG. 3, showing waveforms for the modulated signal 212 generated by the modulator circuit 202, the reference signal 212a that feeds into the comparator 206, the output voltage $V_{out}$, and the voltage $V_{SW}$ at the switching node 218. At a time prior to time $t_1$, the reference signal 212a that feeds into the comparator is not level-shifted. However, at time $t_1$ when the reference signal 212a crosses the output voltage, the comparator 206 will trigger; e.g., the comparator may output a positive-going (rising) edge of a pulse. In response, the switching node 218 will transition its state, which in turn will trigger the onset of capacitance ESL induced pulse artifacts in the output voltage $V_{out}$ via the output pulses at output 216, as explained above. In addition, the level shifter 204 will respond to the positive-going edge of the comparator output and generate a level shift that is AC-coupled to the modulated signal 212. This level shift (voltage offset) will create a level-shifted reference signal 212a; e.g., if the comparator 206 outputs a rising edge, then the level shift will be a positive going level shift. The amount of offset can be controlled by selecting suitable capacitance values for the capacitors C1 and C2 in the capacitor divider network in the level shifter 204.

Continuing with FIG. 5, subsequent to time $t_1$, the level of the reference signal 212a can be made higher than the pulse artifacts. As such, the pulse artifacts will not trigger the comparator 206, since they do cross the level of the reference signal 212a. Accordingly, switching node 218 will maintain its state until the reference signal 212a crosses the output voltage $V_{out}$ on the down slope, at time $t_3$.

At time $t_2$, the positive level shift (offset) can be removed to restore the reference signal 212a back to the modulated signal 212. In some embodiments, the edge (e.g., falling edge) of clock 112 may be used to synchronize removing the positive offset.

At time $t_3$, when the reference signal 212a would cross the output voltage $V_{out}$ on the down slope, the comparator 206 will trigger and cause the switching node 218 to transition. The triggering of comparator 206 will also cause level shifter 204 to generate a negative-going level shift that is AC-coupled to the reference signal 212a. The transition at switching node 218 (time $t_3$) will again trigger the onset of pulse artifacts in the output voltage $V_{out}$. However, the reference signal 212a is now level-shifted down to a level that the subsequent pulse artifacts do not cross over the reference signal and the comparator 206 will not be triggered by the pulse artifacts. Switching node 218 will maintain its state. Thus, by adding a voltage offset to level shift (up or down) the modulated signal 212 in synchrony with the rising and falling edges of the pulse waveform of the comparator 206, the reference signal 212a that the comparator uses can "move" out of the way of the pulse artifacts created by transitions in the switching node 218.

At time $t_4$, the negative level shift (offset) can be removed in order to restore the reference signal 212a back to the modulated signal 212. In some embodiments, the edge (e.g., rising edge) of clock 112 may be used to synchronize removing the negative offset.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

We claim the following:

1. A circuit comprising:
   a first input terminal for a connection to a power source;
   a second input terminal for a connection to a reference potential;
   an output terminal for a connection to a load;
   an inductive element connected to the output terminal;
   a capacitive element connected between the output terminal and the second input terminal;
   a first switch connected between the first input terminal and the inductive element;
   a second switch connected between the inductive element and the second input terminal;
   a reference generator operable to produce a reference signal comprising a triangle wave or a sawtooth wave; and
   a pulse width modulator (PWM) module having an input connected to the output terminal and an input connected to the reference generator, the PWM module operable to produce a pulse waveform to drive the first and second switches, the reference generator further operable to include an additional voltage offset in the triangle wave or the sawtooth wave of the reference signal, the voltage offset varying synchronously with the pulse waveform from the PWM module.

2. The circuit of claim 1 wherein the voltage offset varies in accordance with a step function.

3. The circuit of claim 2 wherein the step function is a clock signal used to generate the reference signal.

4. The circuit of claim 1 wherein the voltage offset varies in accordance with a step function having a decay characteristic.

5. The circuit of claim 1 wherein the voltage offset varies in accordance with rising edges and falling edges of the pulse waveform.

6. The circuit of claim 5 wherein the voltage offset is of a first polarity on the rising edges of the pulse waveform and the voltage offset is of a second polarity on the falling edges of the pulse waveform.

7. The circuit of claim 1 wherein the reference generator comprises a modulator circuit operable to produce a modulated signal and a level shifter connected to receive the pulse waveform from the PWM module, the level shifter operative with the modulator circuit to vary the voltage offset in the modulated signal synchronously with the pulse waveform to produce the reference signal.

8. The circuit of claim 7 wherein the level shifter comprises:
   a digital buffer connected to the PWM module; and
   a capacitor divider network connected to an output of the digital buffer.

9. The circuit of claim 7 wherein the level shifter is AC coupled to an output of the modulator circuit.

10. The circuit of claim 1 further comprising a driver circuit connected to the first and second switches, the driver circuit coupled to receive the pulse waveform from the PWM module and operable to produce drive signals to drive the first and second switches according to the pulse waveform.

11. A circuit comprising:
    a first input terminal for a connection to a power source;
    a second input terminal for a connection to a reference potential;
    an output terminal for a connection to a load;
    a switching circuit having a node for a connection to the output terminal via an inductor;
    a reference generator operable to produce a reference signal comprising a triangle wave or a sawtooth wave; and
    a pulse width modulator (PWM) module having a first input to receive a signal from the output terminal, a second input to receive the reference signal from the reference generator, and an output in electrical communication with the switching circuit, the PWM module operable to output a pulse waveform at the output of the PWM module, the reference generator further operable to shift a level of the triangle wave or the sawtooth wave of the reference signal based on the pulse waveform from the PWM module.

12. The circuit of claim 11 wherein the level of the reference signal is shifted in accordance with rising edges and falling edges of the pulse waveform.

13. The circuit of claim 11 wherein the reference generator comprises a modulator circuit operable to produce the reference signal and a level shifter connected to receive the pulse waveform and operative to produce a voltage offset to shift the level of the reference signal in accordance with the pulse waveform.

14. The circuit of claim 13 wherein the level shifter comprises:
    a digital buffer connected to the PWM module;
    a capacitor divider network connected to an output of the digital buffer; and
    an output capacitor connected to an output of the modulator circuit.

15. The circuit of claim 13 wherein the voltage offset is of a first polarity on rising edges of the pulse waveform and the voltage offset is of a second polarity on falling edges of the pulse waveform.

16. The circuit of claim 11 further comprising a driver circuit having an input to receive the pulse waveform from the PWM module and operable to produce drive signals to drive the switching circuit according to the pulse waveform.

17. The circuit of claim 11 wherein the switching circuit comprises a first transistor and a second transistor.

18. A circuit comprising:
   a circuit input to receive a reference voltage;
   a circuit output to provide an output voltage, the circuit output connectable to a load;
   a modulator circuit having an output to provide a modulated signal using the reference voltage received at the circuit input, the modulated signal comprising a triangle wave or a sawtooth wave;
   a pulse width modulator (PWM) module having an input to receive a signal from the circuit output, an input to receive the modulated signal produced by the modulator circuit, and an output to provide a pulse waveform;
   a switching circuit comprising a first switching transistor and a second switching transistor, which are operable in response to the pulse waveform from the PWM module; and
   a level shifter circuit connected to the output of the modulator circuit, the level shifter circuit operable to shift a level in the triangle wave or the sawtooth wave of the modulated signal in synchrony with rising and falling edges of the pulse waveform from the PWM module.

19. The circuit of claim 18 wherein the level shifter comprises:
   a digital buffer connected to the PWM module;
   a capacitor divider network connected to an output of the digital buffer; and
   an output capacitor connected to an output of the modulator circuit.

* * * * *